United States Patent Office 3,377,844
Patented Apr. 16, 1968

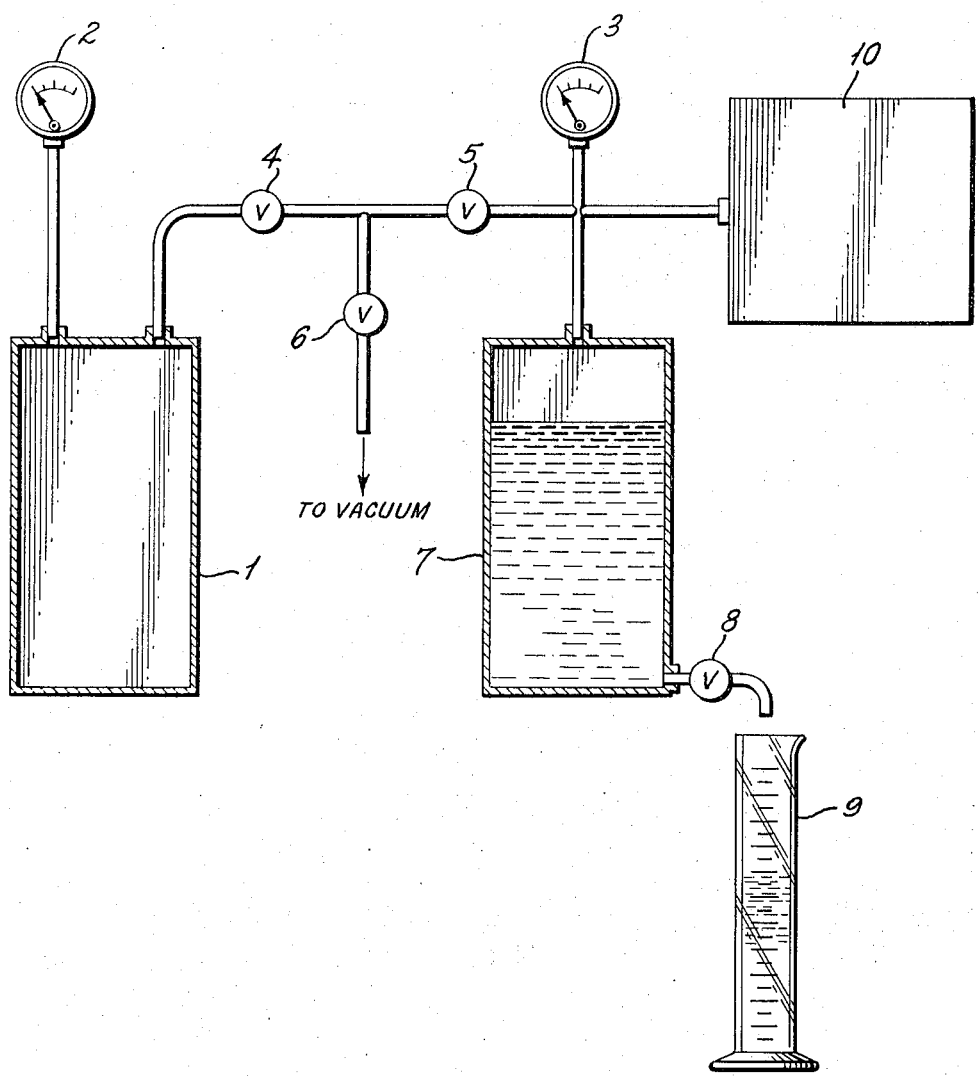

3,377,844
METHOD AND APPARATUS FOR DETERMINING THE AMOUNT OF LEAKAGE FROM CHAMBERS
Jean-Marie Gandolfo, Mol-Donk, Belgium, assignor to European Atomic Energy Community (Euratom), Brussels, Belgium
Filed June 7, 1965, Ser. No. 461,919
Claims priority, application France, July 31, 1964, 983,749
10 Claims. (Cl. 73—49.2)

ABSTRACT OF THE DISCLOSURE

A method and apparatus for determining the amount of fluid leakage from a chamber connected to a container of liquid, in which equal pressure conditions are established in the chamber and in a sealed standard box connected with the chamber, after which the box is isolated from the chamber and liquid evacuated from the container in response to leakage of the chamber to maintain the equal pressure conditions. The volume of the evacuated liquid thus provides a measure of the amount of leakage.

---

This invention relates to a method of and a new and simple apparatus for rapidly and reliably determining the amount of leakage from chambers which may contain dangerous products; the invention applies more particularly, but not exclusively, to glove boxes used in the nuclear industry.

Prior art methods require extreme precautions for determination of an average leakage of 0.05% of the chamber volume per hour. Under such conditions, it is difficult if not impossible to determine the amount of leakage unless the temperatures and pressures are very carefully measured.

One of these methods is based on the Mariotte-Gay Lussac law ($PV = w.RT$) and gives the variation of the weight of the atmosphere of the chamber provided that the value taken for the pressure P is a corrected value which allows for the partial pressure variation of the vapours evolved in the chamber and the expansion of the chamber.

The relative leakage by weight may be calculated with the following formula (in which the indices 1 and 2 denote the beginning and end of the tests):

$$Z = \frac{w_1 - w_2}{w_1} = 1 - \frac{P_2}{P_1} \cdot \frac{T_1}{T_2}$$

with an error calculation formula $$dx \leq 2\left[\frac{dT}{T}\right] + 2\left[\frac{dP}{P}\right]$$

It will be apparent that $dx$ can be minimized by the use of sufficiently accurate instruments and by using the most stable possible conditions.

Assuming that a leakage of 0.05% of the chamber volume per hour is the permissible limit, and that this corresponds to a certain pressure change, such pressure change can be produced by a change of 0.15° C. in the ambient temperature, and this shows the accuracy with which the leakage of chambers must be determined.

In addition, satisfactory performance of measurement tests requires about 10 hours for the examination of just one glove box if accurate results are to be obtained.

Another disadvantage of the prior art methods is the necessity to use precision instruments.

The solution according to the invention reduces the disadvantages of prior art methods for determination of leakage in chambers such as those containing or to contain dangerous products.

According to the invention, a method of determining the amount of leakage in a chamber is characterized in that a tightly sealed standard box is subjected to the same negative pressure as the chamber under test, whereafter the standard box is separated from the chamber by one or more cocks and the chamber under test is continuously kept at the same negative pressure as the standard box by evacuation of liquid from a container connected to the chamber under test, the amount of leakage being calculated from the volume of liquid thus evacuated.

The invention also provides apparatus for determining the amount of leakage from a chamber which apparatus is characterized in that is comprises a tightly sealed standard box provided with a micromanometer and connected to the chamber under test via a pipe or conduit containing two cocks between which is connected a pipe or conduit leading to a vacuum pump and containing a shut-off cock, the chamber under test being arranged to be connected firstly to a micromanometer and secondly to a container which is filled with a liquid having a sufficiently low vapour pressure and the bottom of which is provided with a cock for evacuation of liquid the volume of the evacuated liquid producing a measure of the amount of leakage. The liquid may be evacuated into a graduated vessel or the container may be graduated, for direct reading of the volume of liquid evacuated.

In a preferred embodiment of the invention, the standard box is made of an identical material to that of the chamber under test.

The method and apparatus defined above will provide a measure of the rate of leakage into the chamber which is taken as a measure of the rate of leakage out of the chamber which may be expected.

One specific embodiment of the invention will be described hereinafter by way of example, with reference to the accompanying diagrammatic view of the apparatus according to the invention.

The apparatus forming the subject of this example comprises a tightly sealed standard box 1 of a capacity of approximately 5 litres, provided with a conventional micromanometer 2. The box 1 is connected to the chamber under test (indicated by reference 10) via a pipe containing two cocks 4 and 5 in a straight line.

Between the cock 5 and the test chamber 10 a conventional micromanometer 3 and a container 7 filled with water or some other liquid having a sufficiently low vapour pressure are connected to the pipe containing the cocks 4 and 5 and the chamber 10. The bottom part of the container 7 is provided with a cock 8 for evacuation of water from such container to a vessel 9 so graduated as to allow accurate reading of the volume of water evacuated. The container 7 may be replaced by a graduated container for direct reading of the volume of liquid evacuated.

In use the standard box 1 and the test chamber 10 are subjected to the same negative pressure by a vacuum provided via the cock 6. The latter is then closed, followed by simultaneous closure of cocks 4 and 5. The degree of negative pressure is less than that corresponding to the head of liquid above cock 8.

During the tests the chamber under test and the standard box are continuously kept at the same negative pressure by evacuation of liquid from the container 7 into the vessel 9 via the cock 8.

The amount of leakage F during the time of the test is then calculated from the following formula:

$$F = \frac{1}{V_B} \cdot V_{L_0} \cdot k$$

wherein:

$V_B$ = volume of test chamber
$V_{Le}$ = volume of liquid evacuated
$k$ = correction factor to allow for expansion of atmosphere of chamber under test By way of example:

$k = 1.01$ in the case of $p = -100$ mm. of water
$k = 1.005$ in the case of $p = -50$ mm. of water For good results, the following conditions must be taken into account:

(1) The two boxes must be at the same temperature at the beginning of the tests.

(2) The standard box must be made from a material identical to that of the test chamber, for example PVC or steel.

If the measurements are begun after negative pressure has been applied for one hour (in order to eliminate any errors due to elastic deformation of the materials), a test of 2 hours is quite enough for valid results, the leakages commonly being between 0.1 and 0.5 liter per cubic meter per hour.

The invention is not restricted to the constructional or operational details of the above example.

I claim:

1. A method for determining the amount of fluid leakage from a chamber connected to a container of liquid, said method comprising the steps of establishing equal pressure conditions in said chamber and in a sealed standard box connected with the chamber, isolating said box from said chamber, and evacuating liquid from said container in response to leakage of said chamber to maintain said equal pressure conditions, the volume of the evacuated liquid thus providing a measure of the amount of leakage.

2. An apparatus for determining the amount of fluid leakage from a chamber, said apparatus comprising a sealed standard box, means to establish equal pressure conditions in said chamber and said box, means to isolate said chamber from said box, a container of liquid connected to said chamber, and means to evacuate liquid from said container if leakage has occurred into said chamber to maintain said equal pressure conditions, the volume of the evacuated liquid thus providing a measure of the amount of leakage.

3. The apparatus according to claim 2, further comprising two manometers connected to said box and to said chamber, respectively.

4. The apparatus according to claim 2, wherein said means to establish equal pressure conditions in said chamber and said box comprises a conduit connecting said chamber and said box and means connected to said conduit to apply a vacuum to said chamber and to said box.

5. The apparatus according to claim 4, wherein said means to isolate said chamber from said box comprises at least one shut-off valve disposed in said conduit.

6. The apparatus according to claim 5, wherein there are two shut-off valves disposed in said conduit, said means to apply a vacuum being connected to said conduit between said valves.

7. The apparatus according to claim 4, wherein said means to apply a vacuum includes an additional conduit and a shut-off valve disposed in said additional conduit.

8. The apparatus according to claim 2, wherein said box is made from an identical material to that of said chamber.

9. The apparatus according to claim 2, in which said container is graduated to allow direct reading of the volume of liquid evacuated therefrom.

10. The apparatus according to claim 2, further comprising a graduated vessel into which the liquid is evacuated.

References Cited
UNITED STATES PATENTS

| | | | |
|---|---|---|---|
| 1,720,934 | 7/1929 | Toleik | 73—49.2 |
| 1,827,562 | 10/1931 | Carpenter | 73—40 |
| 2,467,767 | 4/1949 | Mertler | 73—49.3 |
| 2,924,965 | 2/1960 | Westerheim | 73—40 |
| 3,028,750 | 4/1962 | Rondeau | 73—40 X |

LOUIS R. PRINCE, *Primary Examiner.*

JEFFREY NOLTON, *Assistant Examiner.*